(12) United States Patent
Huang et al.

(10) Patent No.: US 11,548,787 B2
(45) Date of Patent: Jan. 10, 2023

(54) METHODS AND COMPOSITIONS FOR TREATING THIEF ZONES IN CARBONATE FORMATIONS USING CROSSLINKED POLYMERIC SYSTEMS WITH SILICON DIOXIDE JANUS NANOSHEETS CROSSLINKER

(71) Applicant: Saudi Arabian Oil Company, Dhahran (SA)

(72) Inventors: Jin Huang, Dhahran (SA); Feng Liang, Cypress, TX (US); Wengang Li, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 185 days.

(21) Appl. No.: 16/904,275

(22) Filed: Jun. 17, 2020

(65) Prior Publication Data
US 2021/0395098 A1     Dec. 23, 2021

(51) Int. Cl.
*C01B 33/12*     (2006.01)
*B82Y 30/00*     (2011.01)
(Continued)

(52) U.S. Cl.
CPC .............. *C01B 33/12* (2013.01); *C09K 8/426* (2013.01); *C09K 8/467* (2013.01); *B82Y 30/00* (2013.01);
(Continued)

(58) Field of Classification Search
None
See application file for complete search history.

(56) References Cited

U.S. PATENT DOCUMENTS

| 7,552,771 B2 | 6/2009 | Eoff et al. |
| 9,228,940 B2 | 1/2016 | Pelletier et al. |

(Continued)

FOREIGN PATENT DOCUMENTS

| JP | 2020522452 | * | 5/2020 |
| WO | 2017011328 A1 | | 1/2017 |
| WO | 2019027817 A1 | | 2/2019 |

OTHER PUBLICATIONS

International Search Report and Written Opinion for International Application No. PCT/US2021/037888 (SA51066), report dated Sep. 22, 2021; pp. 1-16.

(Continued)

*Primary Examiner* — Charles R Nold
(74) *Attorney, Agent, or Firm* — Bracewell LLP; Constance G. Rhegerben; Brian H. Tompkins

(57) ABSTRACT

A chemical gel system having a polymer and a silicon oxide Janus nanosheets crosslinker for treating thief zones in carbonate formations. The polymer and silicon oxide Janus nanosheets crosslinker may form a crosslinked polymer gel to reduce or prevent water production via thief zones during hydrocarbon production. The silicon oxide Janus nanosheets crosslinker includes a first side having negatively charged functional groups and a second side having amines. The negatively charged functional groups may include negatively charged oxygen groups and hydroxyl groups. Methods of reducing water production in a thief zone using the silicon oxide Janus nanosheets crosslinker and methods of manufacturing the silicon oxide Janus nanosheets crosslinker are also provided.

4 Claims, 6 Drawing Sheets

(51) Int. Cl.
*B82Y 40/00* (2011.01)
*C09K 8/42* (2006.01)
*C09K 8/467* (2006.01)

(52) U.S. Cl.
CPC ........... *B82Y 40/00* (2013.01); *C01P 2004/17* (2013.01); *C09K 2208/10* (2013.01)

(56) References Cited

U.S. PATENT DOCUMENTS

| | | | |
|---|---|---|---|
| 9,484,079 | B2 | 11/2016 | Lee |
| 9,708,525 | B2 | 7/2017 | Suresh et al. |
| 9,708,896 | B2 | 7/2017 | Suresh et al. |
| 9,784,079 | B2 | 10/2017 | Salla et al. |
| 9,790,415 | B1 | 10/2017 | Jiang et al. |
| 10,036,239 | B2 | 7/2018 | Salla et al. |
| 10,053,613 | B1 | 8/2018 | Kalgaonkar |
| 11,261,368 | B2 | 3/2022 | Huang et al. |
| 2012/0015852 | A1 | 1/2012 | Quintero et al. |
| 2012/0245058 | A1 | 9/2012 | Monteiro et al. |
| 2014/0015896 | A1* | 1/2014 | Katoh .................. B41J 2/16511 347/30 |
| 2017/0015896 | A1 | 1/2017 | Cox et al. |
| 2017/0204718 | A1 | 7/2017 | Pearl, Jr. et al. |
| 2017/0218250 | A1 | 8/2017 | Boul et al. |
| 2018/0086971 | A1 | 3/2018 | Al-Muntasheri et al. |
| 2018/0320053 | A1 | 11/2018 | Kalgaonkar et al. |
| 2018/0327649 | A1 | 11/2018 | Kalgaonkar |
| 2018/0327652 | A1 | 11/2018 | Kuznetsov et al. |
| 2019/0010377 | A1 | 1/2019 | Boul et al. |
| 2019/0010382 | A1 | 1/2019 | Kuznetsov et al. |
| 2019/0016943 | A1 | 1/2019 | Ren et al. |
| 2020/0377675 | A1 | 12/2020 | Ren et al. |
| 2021/0107798 | A1* | 4/2021 | Wang ...................... C01B 33/18 |

OTHER PUBLICATIONS

International Search Report and Written Opinion for International Application No. PCT/US2021/037897 (SA51067), report dated Sep. 21, 2021; pp. 1-15.

International Search Report and Written Opinion for International Application No. PCT/US2021/037908 (SA51069), report dated Sep. 16, 2021, pp. 1-15.

Luo, Dan et al.; "Synthesis of graphene-based amphiphilic Janus nanosheets via manipulation of hydrogen bonding" Carbon 126, 2018; pp. 105-110.

Zhao, Ziguang et al.; "Dually Responsive Janus Composite Nanosheets" Macromolecules, vol. 48, No. 11, ACS Publications, American Chemical Society, May 29, 2015; pp. 3598-3603.

Babaei, M. et al.; "Promising gene delivery system based on polyethylenimine-modified silica nanoparticles" Cancer Gene Therapy (2017) 00; pp. 1-9.

Buchman, Yekaterina Kapilov et al.; "Silica Nanoparticles and Polyethyleneimine (PEI)-Mediated Functionalization: A New Method of PEI Covalent Attachment for siRNA Delivery Applications" Bioconjugate Chem. Nov. 4, 2013; pp. 1-41.

Gao, Tao et al.; "Monodisperse Hollo Silica Nanospheres for Nano Insulation Materials: Synthesis, Characterization, and Life Cycle Assessment" ACS Appl. Mater. Interfaces 2013, 5; pp. 761-767.

Guo, Qian et al.; "Effects of Surface-Modified Alkyl Chain Length of Silica Fillers on the Rheological and Thermal Mechanical Properties of Underfill" IEEE Trans. on Components, Packaging & Man. Tech., vol. 6, No. 12, Dec. 2016; pp. 1796-1803.

Hummers, William S. et al.; "Preparation of Graphitic Oxide" JACS, Mar. 20, 1958, 80; p. 1339.

Liang, Feng et al.; "Reduced-Polymer-Loading, High-Temperature Fracturing Fluids by Use of Nanocrosslinkers" SPE 177469, Apr. 2017 SPE Journal; pp. 622-631.

Liang, Fuxin et al.; "Inorganic Janus Nanosheets" Agnew. Chem. Int. Ed. 2011, 50; pp. 2379-2382.

Liang, Fuxin et al.; "Janus hollow spheres by emulsion interfacial self-assembled sol-gel process" Chem. Commun., 2011, 47; pp. 1231-1233.

Luo, Dan et al.; "Nanofluid of graphene-based amphiphilic Janus nanosheets for tertiary or enhanced oil recovery: High performance at low concentration" PNAS Jul. 12, 2016, vol. 113, No. 28; pp. 7711-7716.

Luo, Dan et al.; "Secondary Oil Recovery Using Graphene-based Amphiphillic Janus Nanosheet Fluid at Ultralow Concentration" Industrial & Engineering Chemistry Research, 56 (39), 2017; pp. 11125-11132.

Sandberg, Linn Ingunn C. et al.; "Synthesis of Hollow Silica Nanospheres by Sacrificial Polystyrene Templates for Thermal Insulation Applications" Advances in Materials Science & Engineering vol. 2013, Art ID 483651; pp. 1-6.

Sheng, Li et al.; "Janus Silica Hollow Spheres Prepared via Interfacial Biosilicification" American Chemical Society, Langmuir 2015, 31; pp. 11964-11970.

Wu, Hao et al.; "Janus graphene oxide nanosheets prepared via Pickering emulsion template" Carbon 93, 2015; pp. 473-483.

Yin, Taiheng et al.; "Physicochemical properties and potential applications of silica-based amphiphilic Janus nanosheets for enhanced oil recovery" Fuel 237 (2019); pp. 344-351.

Zhao, Xubo et al.; "Biocompatible graphene oxide as a folate receptor-targeting drug delivery system for the controlled release of anti-cancer drugs" Royal Soceity of Chemistry Adv., 2014, 4; pp. 24232-24239.

International Search Report and Written Opinion for International Application No. PCT/US2021/037900 (SA51068) report dated Sep. 21, 2021; pp. 1-13.

U.S. Appl. No. 16/904,174, filed Jun. 17, 2020 and titled "Graphene Oxide Janus Nanosheets Relative Permeability Modifier (RPM) for Reducing Subterranean Formation Water Permeability in Carbonate Formations".

U.S. Appl. No. 16/904,211, filed Jun. 17, 2020 and titled "Silicon Dioxide Janus Nanosheets Relative Permeability Modifier (RPM) for Reducing Subterranean Formation Water Permeability in Carbonate and Sandstone Formations".

U.S. Appl. No. 16/904,253, filed Jun. 17, 2020 and titled "Methods and Compositions for Treating Thief Zones in Carbonate Formations Using Crosslinked Polymeric Systems with Graphene Oxide Janus Nanosheets Crosslinker".

* cited by examiner

METHODS AND COMPOSITIONS FOR TREATING THIEF ZONES IN CARBONATE FORMATIONS USING CROSSLINKED POLYMERIC SYSTEMS WITH SILICON DIOXIDE JANUS NANOSHEETS CROSSLINKER

BACKGROUND

Field of the Disclosure

The present disclosure generally relates to the production of hydrocarbons such as oil and gas from subterranean formations. More specifically, embodiments of the disclosure relate to sealing, plugging, or blocking thief zones in subterranean formations.

Description of the Related Art

The increase in maturing reservoirs in oil and gas production has increased the challenging of managing water production from subterranean formations. Certain levels of water production can detrimentally affect the economic life of hydrocarbon producing wells and can also cause other oilfield-related problems, such as scale deposition, fines migration, corrosion, etc. The water production can manifest as a variety of occurrences, such as water coning, water cresting, bottom water channeling at the wellbore, etc. Water production can also occur as a result of fluid communication between a water-producing zone and an oil- or gas-producing zone via fractures, high-permeability streaks, or fissures. The presence of thief zones (also referred to as "super-K" permeability zones or channels with relatively high absolute permeability) can also cause significant water production in hydrocarbon-producing zones.

SUMMARY

Different techniques have been developed to control water production. Such techniques include mechanical isolation, squeeze cementing, and different chemical treatments. Among these techniques, chemical gel systems have been widely used in field applications to suppress water production and improve oil recovery, especially in those environments in which hydrocarbon-producing zones and water-producing zones cannot be isolated. Gel treatments have been used at injection wells to plug or seal preferentially water thief zones and improve sweep efficiency in reservoirs. In addition, such chemical gel treatments may reduce excess water production during hydrocarbon production.

However, the majority of commercially available chemical treatments, including gel treatments, are designed for sandstone formations and not suitable for carbonate formations. The available chemical treatments are not designed to form chemical bonds to the carbonate rock surface under reservoir conditions. Moreover, commercially available chemical treatments may not perform adequately in sandstone formations. Consequently, there is a need for an improved chemical treatments and techniques for controlling water production and plugging, blocking, or sealing thief zones that may be used in both carbonate formations and sandstone formations.

In one embodiment, a silicon oxide Janus nanosheet crosslinker for carbonate formations is provided. The silicon oxide Janus nanosheet crosslinker includes a silicon oxide nanosheet having a first side and a second side and a functional group bonded to the first side, the functional group selected from the group consisting of OH or $O^-$. The silicon oxide Janus nanosheet crosslinker also includes an amine bonded to the second side.

In some embodiments, the amine is bonded to the second side by an oxygen atom. In some embodiments, the degree of amine functionality of the second side is in the range of 0.01 weight (wt) % to 50 wt %. In some embodiments, the silicon oxide nanosheet has a thickness in the range of in the range of 24 nanometers (nm) to 95 nm. In some embodiments, the silicon oxide Janus nanosheet crosslinker includes an alkyl group bonded to the second side, the alkyl group selected from the group consisting of a C8-C30 alkyl. In some embodiments, the alkyl group is bonded to the second side by an oxygen atom. In some embodiments, the degree of alkyl functionality of the second side is in the range of 0.0 weight (wt) % to 20 wt %. In some embodiments, the amine is polyethylenimine.

In another embodiment, a method for reducing water production in a thief zone in a carbonate formation is provided. The method includes introducing a carrier fluid having a silicon oxide Janus nanosheet crosslinker and a polymer into the carbonate formation. The silicon oxide Janus nanosheet crosslinker includes a silicon oxide nanosheet having a first side and a second side and a functional group bonded to the first side, the functional group selected from the group consisting of OH or $O^-$. The silicon oxide Janus nanosheet crosslinker also includes an amine bonded to the second side.

In some embodiments, the amine is bonded to the second side by an oxygen atom. In some embodiments, the degree of amine functionality of the second side is in the range of 0.01 weight (wt) % to 50 wt %. In some embodiments, the silicon oxide nanosheet has a thickness in the range of in the range of 24 nanometers (nm) to 95 nm. In some embodiments, the silicon oxide Janus nanosheet crosslinker includes an alkyl group bonded to the second side, the alkyl group selected from the group consisting of a C8-C30 alkyl. In some embodiments, the alkyl group is bonded to the second side by an oxygen atom. In some embodiments, the degree of alkyl functionality of the second side is in the range of 0.0 weight (wt) % to 20 wt %. In some embodiments, the amine is polyethylenimine. In some embodiments, the carrier fluid is a polar solvent. In some embodiments, the carrier fluid is water. In some embodiments, the polymer is a polyacrylamide.

In another embodiments, a method of manufacturing a silicon oxide Janus nanosheet crosslinker is provided. The method includes obtaining a silicon oxide hollow nanosphere and functionalizing the surface of the silicon oxide hollow nanosphere using a linker molecule. The method also includes attaching an amine to the linker molecule to produce a silicon oxide hollow nanosphere having an exterior surface with amine functional groups and crushing the silicon oxide hollow nanosphere having an exterior surface with amine functional groups to form a silicon oxide Janus nanosheet crosslinker. The silicon oxide Janus nanosheet crosslinker includes a silicon oxide nanosheet having a first side and a second side and a functional group bonded to the first side, the functional group selected from the group consisting of OH or $O^-$. The silicon oxide Janus nanosheet crosslinker also includes the amine bonded to the second side.

In some embodiments, the amine is bonded to the second side by an oxygen atom. In some embodiments, the amine is polyethylenimine. In some embodiments, the linker molecule is 3-aminopropyltriethoxysilane and succinic anhydride. In some embodiments, the linker molecule is divinyl sulfone (DVS). In some embodiments, the silicon oxide Janus nanosheet crosslinker includes an alkyl group bonded to the second side, the alkyl group selected from the group consisting of a C8-C30 alkyl. In some embodiments, the silicon oxide nanosheet has a thickness in the range of in the range of 24 nanometers (nm) to 95 nm.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a chemical gel system having a polymer and a silicon oxide (also referred to as "silica") Janus nanosheets crosslinker for treating thief zones in carbonate formations. The chemical gel system having a polymer and a silicon oxide Janus nanosheets crosslinker may plug, seal, or block thief zones in a carbonate formation and may reduce or prevent water production via such thief zones during hydrocarbon production. In some embodiments, the polymer is an acrylamide-based polymer. The silicon oxide Janus nanosheet crosslinker includes a crosslinker side having amines and an anionic side having negatively charged functional groups. In some embodiments, the amine is polyethylenimine (PEI). The negatively charged groups may include silanol groups (Si—OH and Si—O$^-$).

The silicon oxide Janus nanosheet crosslinker and a polymer may be introduced into thief zone in a carbonate formation such that the anionic side attaches to the rock surface of pores of the carbonate formation via an anionic bond between the negatively charged groups and the positively charged calcium ions ($Ca^{2+}$) on the rock surface. The crosslinker side of the silicon oxide Janus nanosheets crosslinker faces the pore space. The crosslinker side of the silicon oxide Janus nanosheets crosslinker provides crosslinking sites for the polymer to enable formation of a polymer gel in the pore space. The crosslinked polymer gel may plug, seal, or block the pores or other openings in the thief zone and reduce or prevent water production via the thief zone.

The silicon oxide Janus nanosheets crosslinker may be synthesized from silicon oxide hollow nanospheres obtained commercially or prepared from template spheres, such as polystyrene spheres. The crosslinking side of the silicon oxide Janus nanosheets crosslinker may be prepared by functionalizing the exterior surface of the silicon oxide hollow nanospheres using PEI and one or more linker molecules. In some embodiments, the linker molecules may include 3-aminopropyltriethoxysilane and succinic anhydride. In some embodiments, the linker molecules may include divinyl sulfone (DVS). The surface-functionalized silicon oxide hollow nanospheres may be crushed using a milling process to produce the silicon oxide Janus nanosheets crosslinker for carbonate formations. In some embodiments, the silicon oxide nanosheets crosslinker has a thickness in the range of in the range of 24 nanometers (nm) to 95 nm.

Structure of Silicon Oxide Janus Nanosheets Crosslinker

Figure 1:
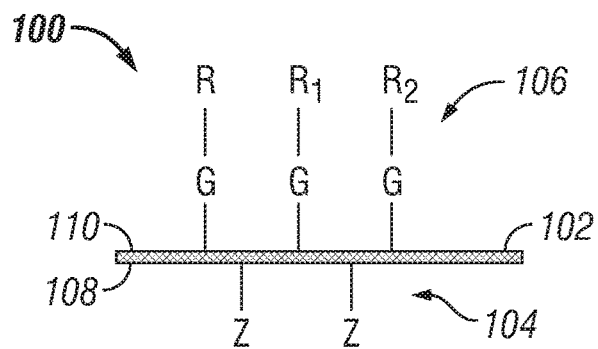
FIG. 1 shows the chemical structure of a silicon oxide Janus nanosheets crosslinker in accordance with an embodiment of the disclosure.

FIG. 1 is shows the structure of a silicon oxide Janus nanosheet crosslinker 100 in accordance with an embodiment of the disclosure. As discussed in the disclosure the silicon oxide Janus nanosheets crosslinker may enable the crosslinking of a suitable polymer (for example, a polyacrylamide-based polymer) in thief zones in a carbonate formation.

As shown in FIG. 1, the silicon oxide Janus nanosheet 100 includes a silicon oxide nanosheet 102 having a first side 104 (referred to as the "anionic" side) that includes negatively charged functional groups and a second and opposite side 106 (referred to as the "crosslinking" side) having one or more amines (that is, molecules containing a basic nitrogen atom with a lone pair of electrons). As used in the disclosure, term "negatively charged groups" may include groups that ionize by releasing a hydrogen (H) atom as a free proton. As discussed infra, the first side 104 that includes negatively charged functional groups may enable the silicon oxide Janus nanosheet 100 to attach to the rock surface of a carbonate formation via interaction with calcium ions ($Ca^{2+}$) present on the carbonate rock surface. The second side 106 having amines acts as a crosslinker for a polymer introduced into the carbonate formation to enable formation of a crosslinked polymer gel.

As first shown in FIG. 1, the first side 104 includes groups Z bonded to a surface 108 of the silicon oxide nanosheet 102. In some embodiments, Z is selected from the group consisting of hydroxyl (OH) and negatively charged oxygen (O$^-$) groups. As these groups are bonded to a silicon atom of the silicon oxide nanosheet, the first side 104 may be also be referred as having silanol functional groups (Si—OH and Si—O$^-$). In other embodiments, Z is selected from the group consisting of carboxyl (COOH and COO$^-$) groups.

The second side 106 includes groups G bonded to the opposite surface 110 of the silicon oxide nanosheet 102 and groups $R_1$ and $R_2$ each bonded to groups G. G is an oxygen atom (O). $R_1$ is an amine. In some embodiments, $R_1$ is polyethylenimine (PEI). In some embodiments, the degree of PEI chain functionality provided by the $R_1$ groups may be in the range of 0.01 weight (wt) % to 50 wt %. $R_2$ is selected from the group consisting of C8 to C30 alkyls (that is an alkyl group having a number of carbon atoms in the range of 8 to 30). In some embodiments, the degree of hydrophobic chain functionality provided by the $R_2$ groups may be in the range of 0.01 weight (wt) % to 20 wt %. In some embodiments, the second side 106 of the silicon oxide nanosheet crosslinker 100 may not include any $R_2$ groups and may only include $R_1$ groups.

Process for Silicon Oxide Janus Nanosheets Crosslinker

Figure 2:
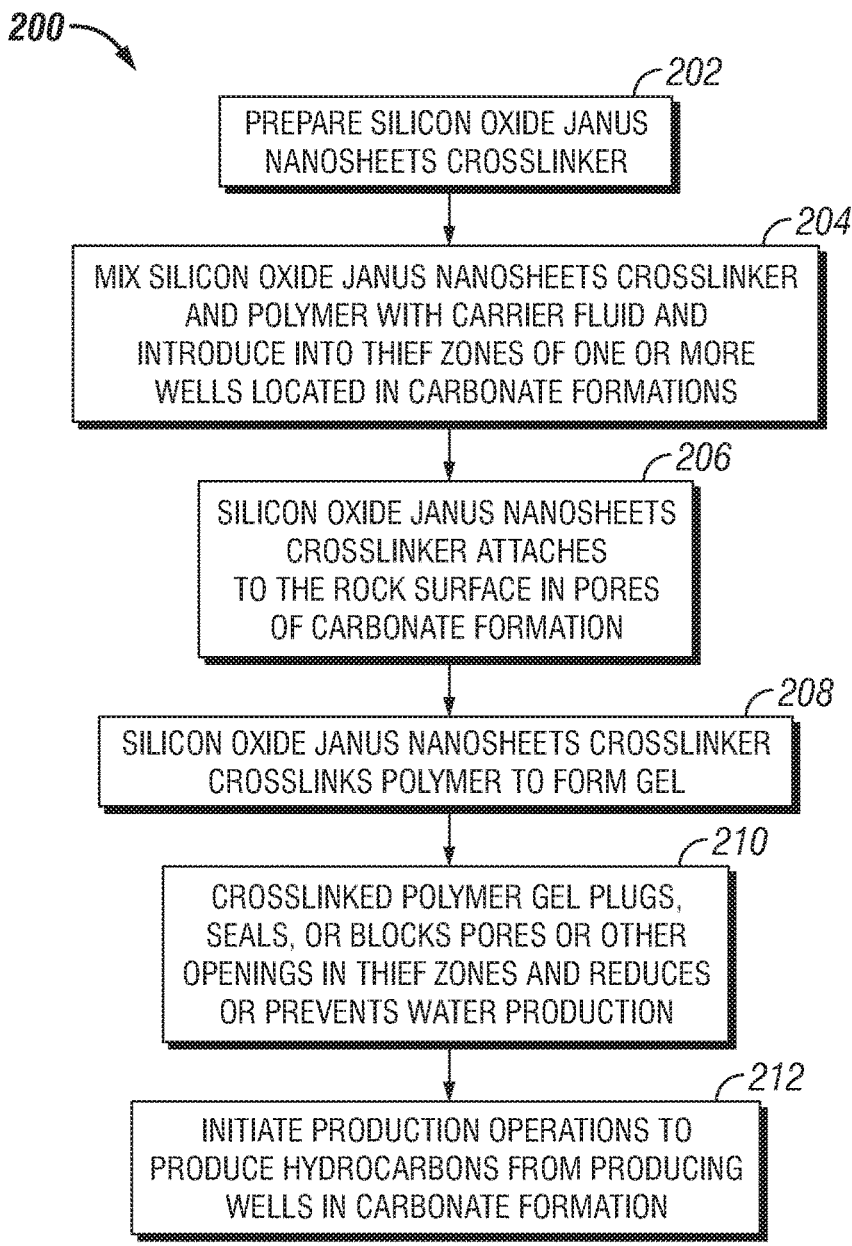
FIG. 2 is a block diagram of a process for using a silicon oxide Janus nanosheets crosslinker in accordance with an embodiment of the disclosure.

FIG. 2 depicts a process 200 for using a chemical gel system of a polymer and a silicon oxide Janus nanosheets crosslinker in accordance with an embodiment of the disclosure. Initially, a silicon oxide Janus nanosheets crosslinker may be prepared (block 202). The silicon oxide Janus nanosheets crosslinker may be prepared at a wellsite or, in some embodiments, prepared offsite and then transported to the wellsite. In some embodiments, a polymer and the silicon oxide Janus nanosheets crosslinker may be mixed with a carrier fluid and introduced into thief zones in one or more wells located in carbonate formations (block 204). The carrier fluid may be water or a water-based fluid (for example, a base of seawater, freshwater, or brine). The one or more wells may include producing wells, injection wells, or a combination thereof. In other embodiments, the silicon oxide Janus nanosheets crosslinker and polymer may be introduced into a well separately. In such embodiments, the silicon oxide Janus nanosheets crosslinker may be may be mixed with a first carrier fluid and introduced into one or more wells located in carbonate formations. The first carrier fluid may be water, a water-based fluid, or a polar solvent. The polymer may then be mixed with a second carrier fluid and introduced into the one or more wells after the introduction of the silicon oxide Janus nanosheets crosslinker. The second carrier fluid may be water or a water-based fluid.

After injection, the silicon oxide Janus nanosheets crosslinker may attach to the rock surface in pores and other openings in the carbonate formation (block 206) due to the ionic interaction between the negatively charged side of the silicon oxide Janus nanosheets and the positively charged calcium ions ($Ca^{2+}$) on the rock surface, such that the crosslinking side of the silicon oxide Janus nanosheets is oriented outward away from the rock surface (for example, toward the pore space of a pore in the rock). The silicon oxide Janus nanosheets crosslinker interacts with the polymer to form a crosslinked polymer gel in the openings (block 208). The amines on the crosslinking side of the silicon oxide Janus nanosheets crosslinker provide crosslinking sites for the polymer. For example, in some embodiments, an acrylamide-based polymer (such as PAM) may crosslink with the amines via a transamidation reaction. The crosslinked polymer gel may plug, seal, or block the pores or other openings in the thief zones and reduce or prevent water production via the thief zones (block 210).

Next, production operations may be initiated (block 212) to produce hydrocarbons from producing wells with reduced water production from the one or more wells having the chemical gel system of a polymer and a silicon oxide Janus nanosheets crosslinker. As will be appreciated, the crosslinked polymer gel may remain in the thief zones without much mobilization due to the bond between the anionic side of the silicon oxide Janus nanosheets crosslinker and the carbonate rock surface, thus ensuring the water production remains reduced during production.

Figure 3:
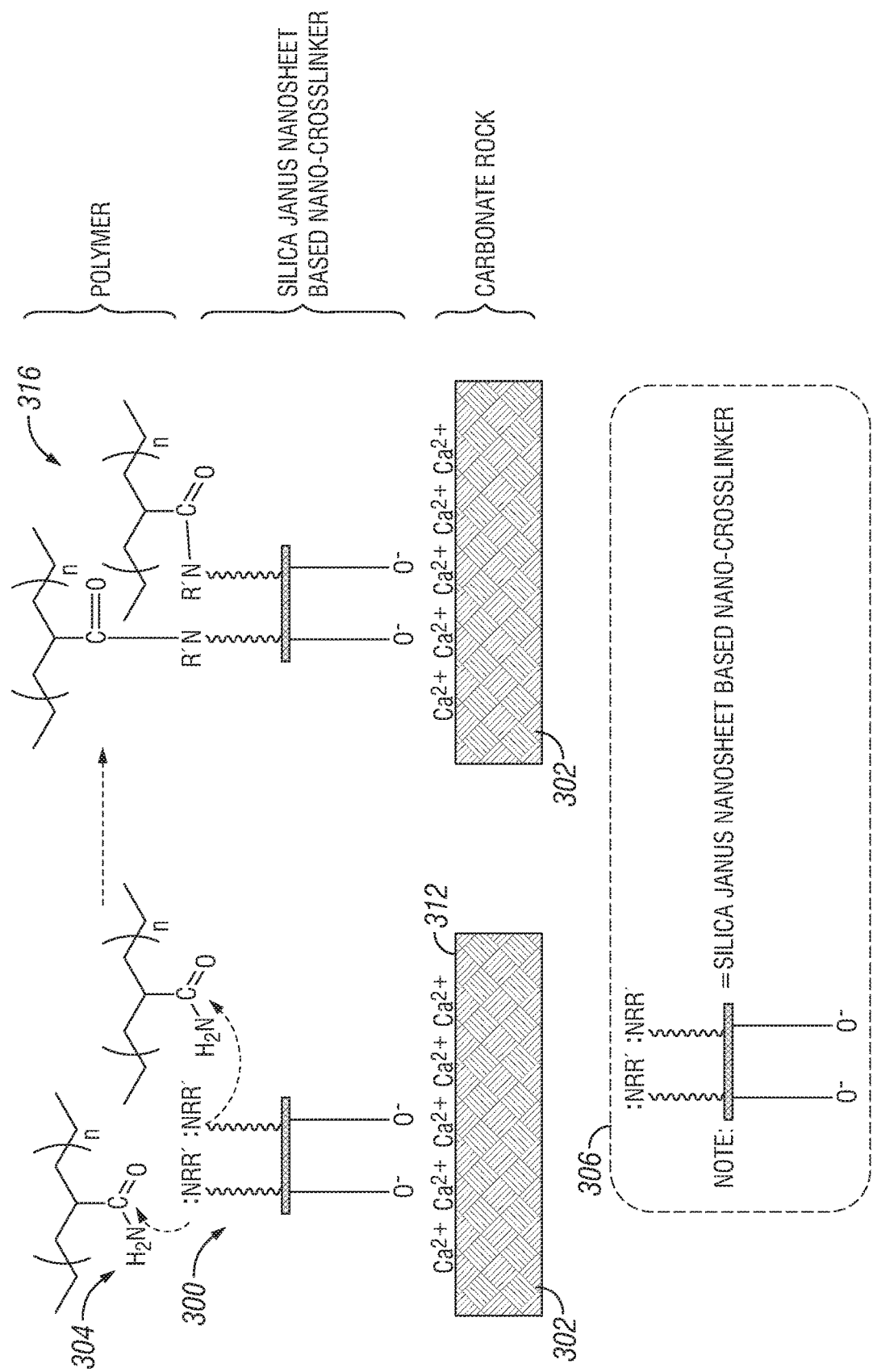
FIG. 3 is a schematic diagram depicting the mechanism of a silicon oxide Janus nanosheets crosslinker in a carbonate formation in accordance with an embodiment of the disclosure.

FIG. 3 depicts the mechanism of a silicon oxide Janus crosslinker 300 in carbonate rock 302 in accordance with an embodiment of the disclosure. The carbonate rock 302 may be located in a thief zone in the formation that produces water in a well. As described in the disclosure, the silicon oxide Janus nanosheets crosslinker 300 may provide for the formation of a crosslinked polymer gel attached to the carbonate rock 302 to reduce or prevent water production in a thief zone.

As shown in inset 306 in FIG. 3, the silicon oxide Janus nanosheets crosslinker 300 includes a first side 308 having negatively charged groups (by way of example, only negatively charged oxygen groups are shown in FIG. 3) and a second (crosslinking) opposite side 310 having amines. As shown in FIG. 3, the first side 308 interacts with the calcium ions ($Ca^{2+}$) on the surface 312 of the carbonate rock 302 to attach the first side 308 of the silicon oxide Janus nanosheets crosslinker 300 to the carbonate rock 302. After attaching the silicon oxide Janus nanosheets crosslinker 300 to the carbonate rock 302, the second side 310 of the silicon oxide Janus nanosheets crosslinker 300 is oriented outward from the surface 312, such as toward a pore space of a pore in the carbonate rock 302.

The second side 310 of the silicon oxide Janus nanosheets crosslinker 300 provides a crosslinking site for a polymer 304. As illustrated in FIG. 3, for example, the amide group 314 of the polymer 304 may react with the amine of the second side 310 of the silicon oxide Janus nanosheets crosslinker 300 via a transamidation reaction. FIG. 3 also depicts the resulting crosslinked polymer 316 bonded to the second side 310 of the silicon oxide Janus nanosheets crosslinker 300. The crosslinked polymer 316 may form a gel that reduces or prevents the flow of water via pores or other openings in the carbonate rock 302.

Synthesis of Silicon Oxide Janus Nanosheets Crosslinker

Figure 4:
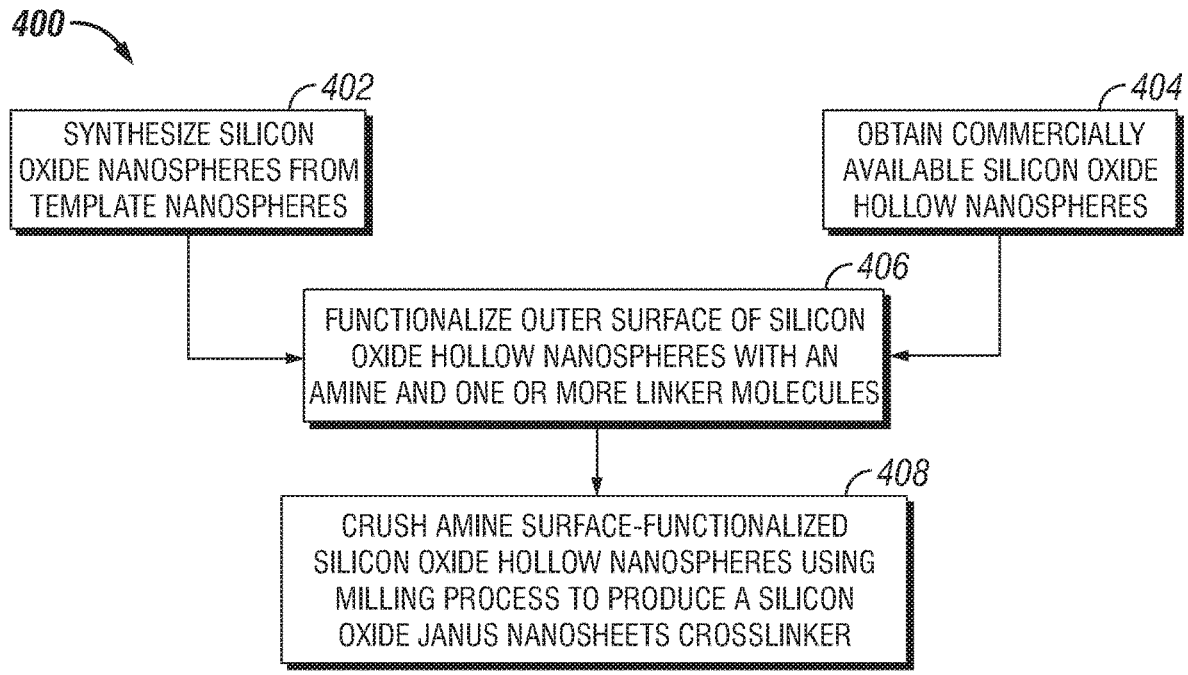
FIG. 4 is a block diagram of a process for the synthesis of a silicon oxide nanosheet crosslinker in accordance with an embodiment of the disclosure.

FIG. 4 depicts a process 400 for the synthesis of a silicon oxide nanosheet RPM in accordance with an embodiment of the disclosure. In some embodiments, silicon oxide nanosheets may be prepared from silicon oxide nanospheres. Initially, silicon oxide hollow nanospheres may be synthesized using template nanospheres (block 402). In such embodiments, template nanospheres (for example, polyvinylpyrrolidone (PVP)-stabilized polystyrene) are prepared or obtained. Silicon oxide is grown on the nucleation sites provided by the template nanospheres, and the template nanospheres after grown of a desired coating of silicon oxide. For example, polystyrene template nanospheres may be removed by burning off the polystyrene core via heat treatment (such as heating to a temperature of at least 400° C.).

Figure 5:
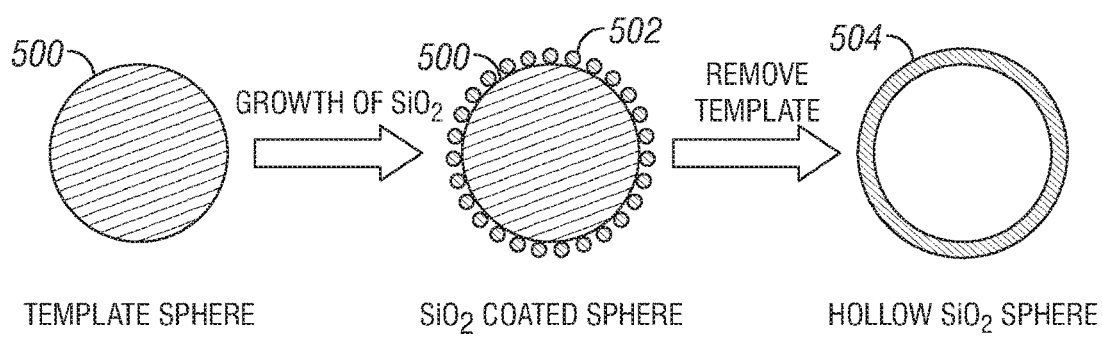
FIG. 5 depicts the chemical structure of an example single layer silicon oxide nanosheet produced according to an embodiment of the disclosure.

FIG. 5 illustrates step 402 of the process 400 in accordance with an embodiment of the disclosure. As shown in FIG. 5, A template nanosphere 600 (for example, a polyvinylpyrrolidone (PVP)-stabilized polystyrene nanosphere) is obtained. Silicon oxide ($SiO_2$) is grown on the surface nucleation sites of the template nanosphere 600 to produce a silicon oxide-coated nanosphere 602 around the template nanosphere 600. The template nanosphere 600 is then removed (for example, by heat treatment) to produce a silicon oxide hollow nanosphere 604.

In other embodiments, commercially available silicone oxide hollow nanospheres may be obtained (block 404). For example, in some embodiments, the silicone oxide hollow nanospheres may be obtained in nanopowder form from American Elements of Los Angeles, Calif., USA.

Next, the outer surface of the silicon oxide hollow nanospheres may be functionalized with an amine (for example, PEI) using one or more linker molecules (block 406). In some embodiments, the PEI may include PEI having the following molecular weights: 1800 Daltons, 10000 Daltons, and 24000 Daltons.

In some embodiments, the functionalization of the silicon oxide hollow nanospheres with PEI is performing according to the following procedure: 1) Disperse the silicon oxide hollow nanospheres in dry toluene and add 3-aminopropyltriethoxysilane to the mixture with continuous stirring; 2) Reflux the mixture for a time period of at least 12 hours to produce silicon oxide polyamine hollow nanospheres; 3) Filter off the silicon oxide polyamine hollow nanospheres, wash with a solvent (for example, toluene and ethanol), and dry for a time period (for example, at a temperature of at least 60° C. for at least 3 hours); 4) disperse the silicon oxide polyamine hollow nanospheres in a solvent (for example, dry toluene) and add succinic anhydride to the mixture as a linker for covalent grafting of the PEI onto surface of the silicon oxide polyamine hollow nanospheres; 5) Reflux the mixture for a time period of at least 4 hours to form Si—COOH groups on the surface of the silicon oxide polyamine hollow nanospheres; and 6) Add 1-ethyl-3-(3-dimethylaminopropyl)carbodiimide (EDC), N-hydroxysuccinimide (NHS), and an aqueous solution of PEI to the mixture of silicon oxide polyamine hollow nanospheres having Si—COOH groups and stir for a time period of at least 3 days to produce PEI-functionalized silicon oxide hollow nanospheres; and 7) Purify the PEI-functionalized silicon oxide hollow nanospheres using dialysis of the mixture using deionized water.

Figure 6:
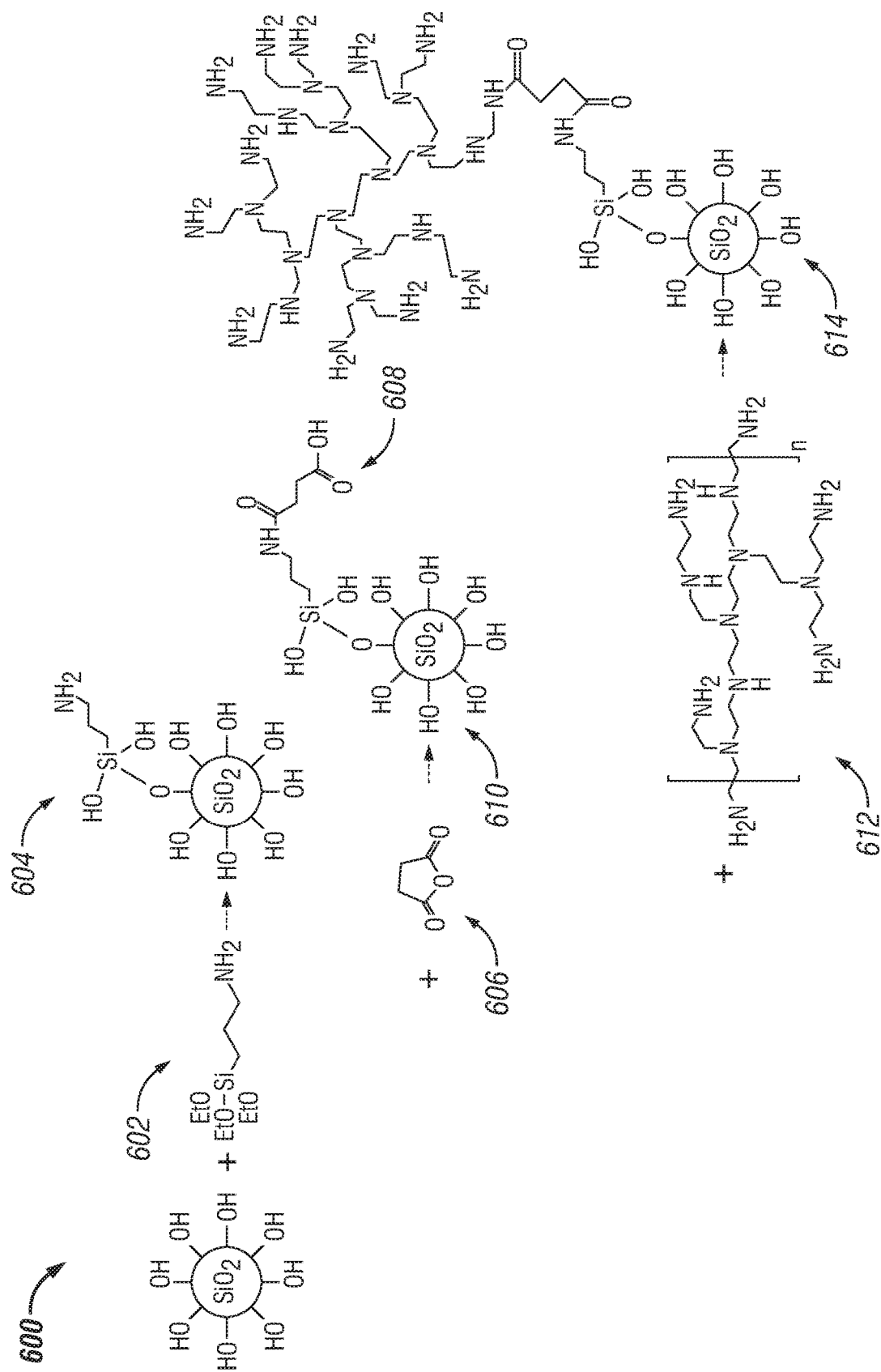
FIG. 6 shows a chemical reaction scheme for preparing and functionalizing silicon oxide coated wax microspheres to produce polyethylenimine (PEI)-functionalized silicon oxide nanosheets in accordance with an embodiment of the disclosure.

FIG. 6 illustrates step 406 of the process 400 in accordance with an embodiment of the disclosure. As shown in FIG. 6, a silicon oxide hollow nanosphere 700 is mixed with 3-aminopropyltriethoxysilane 702 to form silicon oxide polyamine hollow nanospheres 704. As discussed in the procedure described supra, the silicon oxide polyamine hollow nanospheres may be mixed with succinic anhydride 706 to form Si—COOH groups 708 on the surface of the silicon oxide polyamine hollow nanospheres. The silicon oxide polyamine hollow nanospheres 710 having Si—COOH groups may then be mixed with PEI 712 according to the procedure described in the disclosure to form PEI surface-functionalized silicon oxide hollow nanospheres 714.

In additional or alternative embodiments, the silicon oxide hollow nanospheres may be functionalized by converting the silicon oxide hollow nanospheres to the silicon oxide polyamine hollow nanospheres and using divinyl sulfone (DVS) as a linker molecule. In some embodiments, the functionalization of the silicon oxide hollow nanospheres with PEI is performing according to the following procedure: 1) Mix the silicon oxide hollow nanospheres in ethanol and add (3-Aminopropyl)triethoxysilane (APTS or APTES) to the mixture with continuous stirring for a time period of at least 24 hours to produce silicon oxide polyamine hollow nanospheres; 2) Purify the silicon oxide polyamine hollow nanospheres using centrifugation-sonication-redispersion using a water-ethanol mixture followed by absolute ethanol; 3) Disperse the silicon oxide polyamine hollow nanospheres in isopropyl alcohol, add divinyl sulfone (DVS) to the mixture; 4) Stir the mixture for at least 2 hours at ambient temperature followed by washing and redispersion (for example, using sonication) in isopropyl alcohol to produce silicon oxide polyamine hollow nanospheres having —SO$_2$CH$_2$ groups; 5) Add PEI in solution (for example, in a solution of isopropyl alcohol) to the mixture; 6) Sonicate the mixture for 5 minutes and stir for at least 8 hours to produce PEI surface-functionalized silicon oxide hollow nanospheres; and 7) Wash the PEI surface-functionalized silicon oxide hollow nanospheres in a solvent using centrifugation to remove excess PEI.

Figure 7:
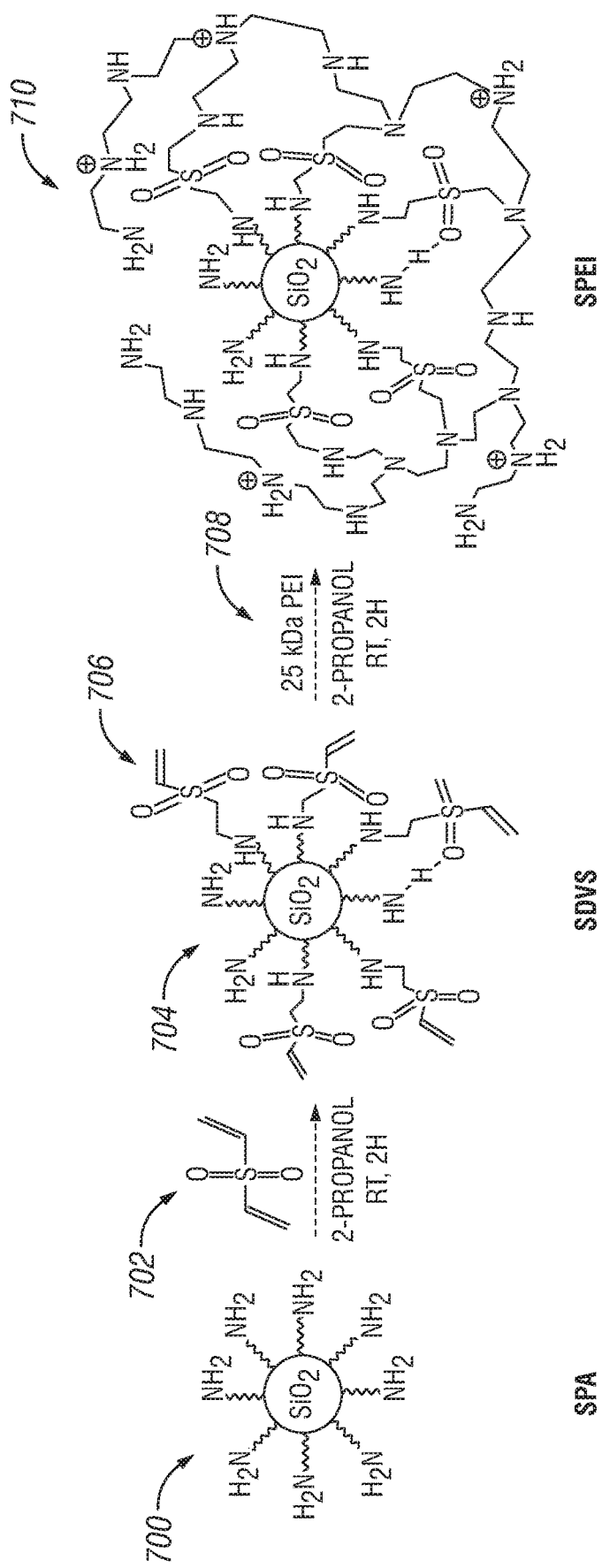
FIG. 7 shows a chemical reaction scheme for functionalizing a side of a PEI-functionalized silicon oxide nanosheet using chloroacetic acid in accordance with an embodiment of the disclosure.
Figure 8:
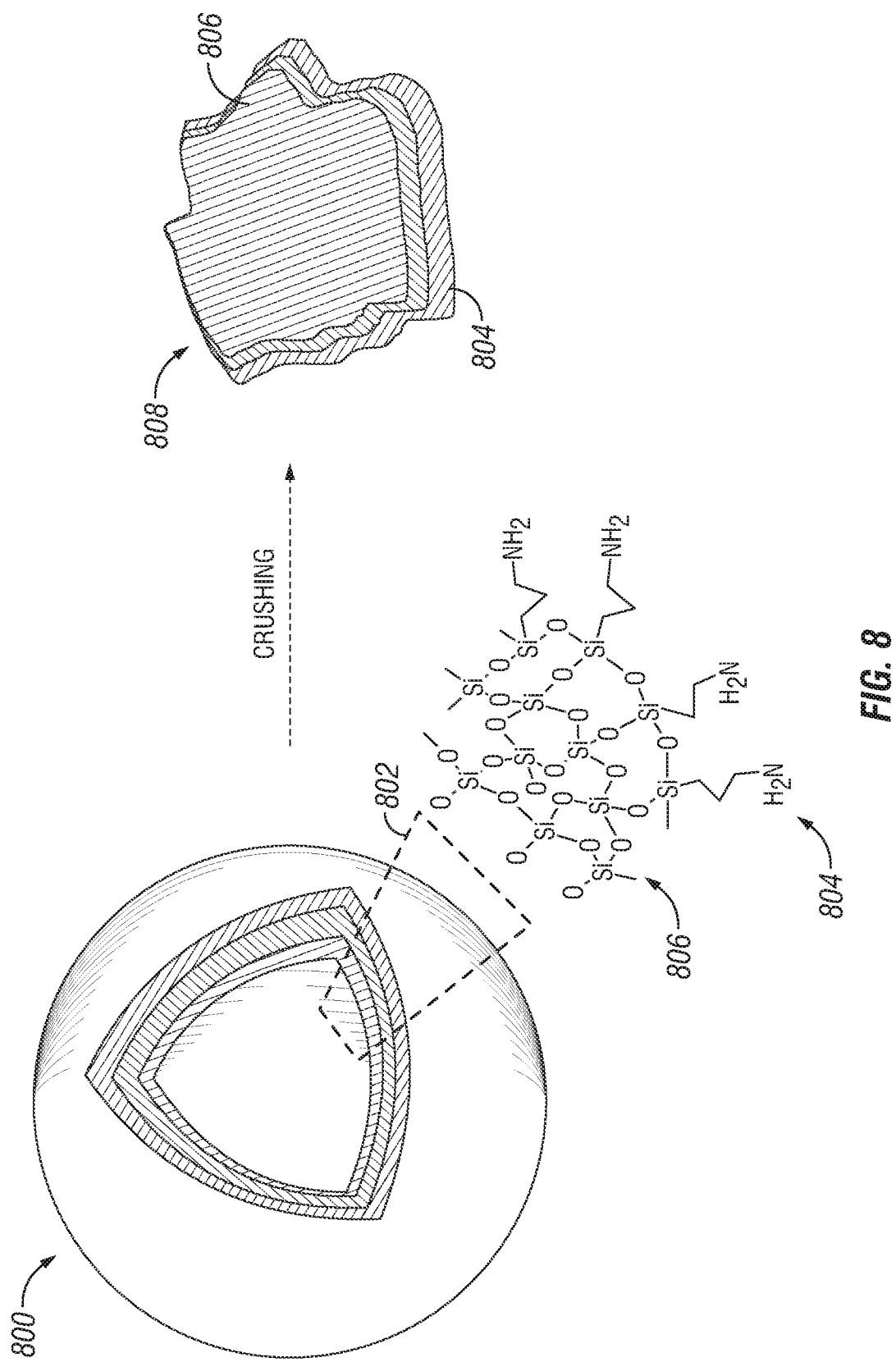
FIG. 8. is a schematic diagram of the crushing of a nanosphere in accordance with an embodiment of the disclosure.

FIG. 7 illustrates step 406 of the process 400 in accordance with another embodiment of the disclosure. As shown in FIG. 8, a silicon oxide hollow nanosphere 700 is dispersed an isopropyl alcohol and mixed with divinely sulfone (arrow 702) according to the procedure discussed supra to produce silicon oxide polyamine hollow nanospheres 704 having —SO$_2$CH$_2$ groups 706. The silicon oxide polyamine hollow nanospheres 704 having —SO$_2$CH$_2$ groups 706 are dispersed in isopropyl alcohol and mixed with PEI (arrow 708) according to the procedure described in the disclosure to produce PEI-functionalized silicon oxide hollow nanospheres 710.

As shown in FIG. 4, the amine surface-functionalized silicon oxide hollow nanospheres may be crushed using a milling process to produce the silicon oxide Janus nanosheets crosslinker (block 408). The silicon oxide hollow nanospheres may be crushed using a colloid milling process. In such embodiments, the cross-sectional dimensions of the nanosheets may be tunable by adjusting the mill spacing the between the rotators of the mill and adjusting the milling time. For example, to decrease the cross-sectional dimensions of the nanosheets, the spacing between the rotators may be decreased. In some embodiments, the resulting silicon oxide Janus nanosheets crosslinker may have a thickness in the range of 24 nm to 95 nm. After crushing, the resulting silicon oxide Janus nanosheets crosslinker may have a crosslinker side of PEI groups (from the PEI functionalization) and the other anionic side having the silanol group.

FIG. 8 depicts an example nanosphere 800 formed according to the process 800. As shown in FIG. 8, the sphere 800 may have a Janus interface 802 of an exterior crosslinking surface 804 having PEI groups and an interior surface 806 having silanol groups (for example, Si—OH and Si—O$^-$ groups). FIG. 8 also depicts a silicon oxide Janus nanosheet crosslinker 806 formed from the crushed sphere 800, such that the nanosheet has a first (crosslinking) side 804 of PEI functional groups and the second (anionic) side 806 corresponding to the exterior and interior surfaces of the sphere 800.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A silicon oxide Janus nanosheet crosslinker for carbonate formations, comprising:
   a silicon oxide nanosheet having a first side and a second side;
   at least two functional groups bonded to the first side, the functional groups comprising an OH group and an $O^-$ group;
   an amine bonded to the second side, wherein the amine is bonded to the second side by an oxygen atom and the amine comprises polyethylenimine; and
   an alkyl group bonded to the second side, wherein the alkyl group is selected from the group consisting of a C8-C30 alkyl, wherein the alkyl group is bonded to the second side by an oxygen atom.

2. The silicon oxide Janus nanosheet crosslinker of claim 1, wherein the degree of amine functionality of the second side is in the range of 0.01 weight (wt) % to 50 wt %.

3. The silicon oxide Janus nanosheet crosslinker of claim 1, wherein the silicon oxide nanosheet has a thickness in the range of in the range of 24 nanometers (nm) to 95 nm.

4. The silicon oxide Janus nanosheet crosslinker of claim 1, wherein the degree of alkyl functionality of the second side is in the range of 0.0 weight (wt) % to 20 wt %.

\* \* \* \* \*